(12) United States Patent
Savel, III

(10) Patent No.: US 6,613,251 B2
(45) Date of Patent: Sep. 2, 2003

(54) METHOD OF FORMING A CERAMIC ARTICLE INCLUDING SILICON CARBIDE

(75) Inventor: Frank J. Savel, III, Chardon, OH (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 10/016,343

(22) Filed: Dec. 10, 2001

(65) Prior Publication Data

US 2003/0107140 A1 Jun. 12, 2003

(51) Int. Cl.$^7$ .......................... C01B 31/36; C01B 31/00
(52) U.S. Cl. ........................ 264/29.7; 423/345
(58) Field of Search .............................. 264/29.1, 29.7; 423/345

(56) References Cited

U.S. PATENT DOCUMENTS

| | | | |
|---|---|---|---|
| 4,377,563 A | * | 3/1983 | Seimiya ..................... 423/345 |
| 4,839,150 A | * | 6/1989 | Coyle et al. ................ 423/345 |
| 5,323,742 A | | 6/1994 | Hamada |
| 5,324,494 A | * | 6/1994 | Glatzmaier ................. 423/345 |
| 5,832,889 A | | 11/1998 | Naruoka et al. |
| 5,899,385 A | | 5/1999 | Hofmann et al. |
| 5,960,756 A | | 10/1999 | Miyachi et al. |
| 6,051,096 A | | 4/2000 | Nagle et al. |
| 6,124,028 A | | 9/2000 | Nagle et al. |

OTHER PUBLICATIONS

"Carbonized Wood Monoliths–Characterization", Byrne & Nagle, Carbon vol. 35, No. 2, pp 267–273.
"High Temperature Compressive Mechanical Behavior of Biomorphic Silicon Carbide Ceramics", Fernandez and Valera–Feria, Aug. 2000.
"Carbonization of Wood for Advanced Materials Applications", Byrne and Nagle, Carbon vo. 25 No. 2, pp 259–266.
Materials & Structures TOP3–00078, Technology Opportunity, NASA Glenn Research Center Manufacturing of Low Cost and Tailorable Property Silicon Carbide Ceramics.
Materials & Structures TOP3–00138, Technology Opportunity, NASA Glenn Research Center Fabrication Approaches for Ecoceramics.
Environment Conscious Ceramics (ECECERAMICS), Ceramic Engineering and Science Proceedings (2000) in press.

* cited by examiner

Primary Examiner—Christopher A. Fiorilla
(74) Attorney, Agent, or Firm—Tarolli, Sundheim, Covell & Tummino L.L.P.

(57) ABSTRACT

A method of making a ceramic article includes the providing a member. The member includes a cellulose-based material. The cellulose-based material is carbonized to carbon. At least a portion of the member is covered with silica sand after carbonization. At least a portion of the carbon of said member, which has been carbonized, is converted to silicon carbide.

18 Claims, 1 Drawing Sheet

METHOD OF FORMING A CERAMIC ARTICLE INCLUDING SILICON CARBIDE

FIELD OF THE INVENTION

The present invention relates to a method of forming a ceramic article, and particularly relates to a method of forming a ceramic engine component.

BACKGROUND OF THE INVENTION

Silicon carbide based ceramics have received considerable attention for use as high performance structural materials where high strength, toughness retention, oxidation resistance, thermal shock resistance, and high thermal conductivity are demanded at temperatures approaching 1400° C.

Ceramic articles made of silicon carbide are typically formed from particles of silicon carbide. One process for manufacturing particles of silicon carbide is the Acheson process. In this process, large cylinders of green solid carbon are laid out horizontally and packed in granular coke. The granular coke is then covered with granular sand. Large water-cooled electrodes are attached to the stack of the carbon cylinders, granular coke, and sand. A high current is passed through the stack to resistance heat the stack. During resistance heating, temperatures of 2000° C.–3000° C. are generated, which graphitizes the solid carbon. At the same time, a reaction between the sand and coke produces particulate silicon carbide.

Traditional processes for making a ceramic article from ceramic particles involve sintering or densifying the ceramic particles by heat treatment. Silicon carbide particles do not readily sinter due to limited diffusion between the particles of silicon carbide. Moreover, silicon carbide particles cannot be readily sintered into a discrete shape, making necessary the machining of the sintered material when close tolerances are called for. Many industrial applications, where silicon carbide particles are used, make use of a metallic phase, which acts as glue holding together the silicon carbide particles.

In some cases, ceramic articles of silicon carbide can be manufactured directly without forming intermediate ceramic particles. For example, U.S. Pat. Nos. 6,051,096 and 6,124,028, both to Nagle and Byrne, disclose a method of forming a ceramic article from a carbon precursor. In the method, wood is carbonized under controlled atmosphere and temperature conditions to produce a porous carbon product having the same cellular structure as the precursor wood. The porous carbonized wood is converted to a ceramic article by placing the porous carbonized wood in a sol gel of silica, drying the porous carbonized wood, and then heating the dried carbonized wood. Alternatively, the porous carbonized wood is placed on a bed of lump silicon within a graphite boat and heated until the silicon liquefies and reacts with the carbon to form silicon carbide. The ceramic articles formed by these methods have a silicon carbide honeycomb structure with silicon filling the pores.

SUMMARY OF THE INVENTION

The present invention relates to a method of making a ceramic article. In the method, a member is provided. The member includes a cellulose-based material. The cellulose-based material is carbonized to carbon. At least a portion of the member is covered with silica sand after carbonization. At least a portion of the carbon of the member, which has been carbonized, is converted to silicon carbide.

Another aspect of the present invention relates to a method of making a ceramic engine component. In the method, a cellulose-based member is provided. The member is heated in a substantially non-oxidizing atmosphere to carbonize the cellulose-based member to substantially carbon. The member is machined after carbonization to provide at least one surface of the member with a $R_a$ surface texture with a maximum of about 1.0 $\mu$m. The machined member is covered with silica sand. The amount of sand, upon reaction with the carbon in the member, is effective to convert substantially all of the carbon to silicon carbide. The machined member covered with the silica sand is heated in a substantially non-oxidizing atmosphere until essentially all of the carbon in the member reacts with the silica sand to form silicon carbide.

BRIEF DESCRIPTION OF THE DRAWINGS

The foregoing and other features of the present invention will become more apparent to one skilled in the art upon consideration of the following description of invention and the accompanying drawings in which.

DESCRIPTION

The present invention relates to a method of making a ceramic article that has a high hardness, a high temperature resistance, and thermal shock resistance. By "high temperature resistance" it is meant the ability of the ceramic article to withstand melting and or decomposition when exposed to high temperatures (i.e., temperatures greater that about 1000° C.). By "thermal shock resistance" it is meant the ability of the article to withstand stress induced within the article when the article is exposed to a sudden temperature increase.

Figure 1:
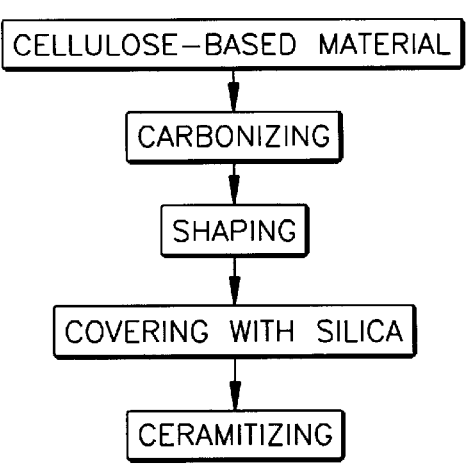
FIG. 1 is a schematic illustration of a method of forming a ceramic article in accordance with the present invention.

FIG. 1 is a schematic block diagram illustrating a method of making the ceramic article. In the method, a member is provided that includes a cellulose-based material. By "cellulose-based material", it is meant any material where cellulose comprises a portion of the material. The member, preferably, consists essentially of the cellulose-based material and, more preferably, is formed from the cellulose-based material. It is contemplated, though, that only a portion of the member includes the cellulose-based material and that only a portion of the member is formed from the cellulose-based material.

An example of one cellulose-based material that can be used to form the member is wood. Wood comprises a tissue that includes cells and intracellular material. The basic component of all wood cell walls is cellulose. Cellulose is a long chain polysaccharide composed of glucose. Wood tissue also includes lower molecular weight polysaccharides that are different from cellulose in structure and molecular weight but have enough similarities to be called hemicellulose. Together, the cellulose and hemicellulose comprise 65% to 75%, by weight, of dry wood.

The wood used in the present invention can be a hardwood or a softwood. The specific application of the ceramic article formed by the method of the present invention determines which species of wood is selected for use in forming the ceramic article. Each species of wood has different wood properties. These wood properties include density, stiffness, strength, hardness, permeability, decay resistance, and workability. These wood properties affect the physical characteristics (e.g., microstructure) and the mechanical properties (e.g., strength) of the ceramic article formed from the wood.

The wood used in accordance with the present invention is cut from the desired species of tree and dried. Kiln drying is the preferred method of drying the wood. The dried wood is then cut to shape. The wood may be cut into any desired shape and any suitable size depending on the desired use of the ceramic article. Thus, relatively large or small blocks, sheets, strips, rods and other shapes may be formed from the wood in accordance with the method of the present invention.

An example of another cellulose-based material that can be used to form the member of the present invention is an engineered wood product. An engineered wood product is a wood composite that is formed from cellulosic wood materials, such as wood particles and/or wood fibers, and a natural and/or synthetic binder. Examples of engineered wood products are fiberboard, chipboard, oriented strand board-fiberboard composites, particle board, and oriented strand board-particle composites. These engineered wood products are commercially available at a relatively low cost compared to natural wood and are available in a variety of shapes, sizes, and surface finishes. A preferred engineered wood product is a MASONITE fiberboard product manufactured by Masonite Co. Building Products, of Chicago. MASONITE fiber board is a preferred product because it has a low cost and can be readily shaped using conventional tools.

Examples of other cellulose-based materials that can be used to form the member of the present invention are cotton-based materials, such as paper products and cotton-based composites, and other plant products. These other cellulose-based material can also be provided in a variety of shapes and sizes.

After the member has been provided, the cellulose-based material of the member is converted to carbon by carbonization. Carbonization involves the destructive distillation (i.e., pyrolysis) of the cellulose-based material to carbon.

The carbonization of cellulose-based materials to carbon is well known. One method of carbonizing a cellulose-based material to carbon is described in U.S. Pat. Nos. 6,051,096 and 6,124,028, both to Nagle and Byrne. In accordance with this method, the cellulose-based material of the member can be placed in a conventional heating apparatus, such as a furnace or oven, and heated in the presence of an inert atmosphere.

The inert atmosphere is preferably non-oxidizing. By "non-oxidizing" it is meant that the inert atmosphere contains less than about 5% by volume oxidizing gas (i.e., oxygen and/or other oxidizing gas). Preferably, the inert atmosphere includes less than about 1% by volume oxidizing gas, and more preferably less than about 1000 ppm oxidizing gas. Examples of non-oxidizing atmospheres are vacuums and atmospheres, which consist essentially of inert gases and/or noble gases. An atmosphere that consists essentially of nitrogen gas is a preferred non-oxidizing atmosphere.

The member of cellulose-based material may be heated at subatmospheric, atmospheric, or superatmospheric pressures. Preferably, the cellulose-based material is heated at essentially atmospheric pressure for convenience.

The member of cellulose-based material is preferably heated to a temperature of at least about 300° C. Heating to a temperature of from about 400° C. to about 1000° C. is preferred for achieving carbonization of most wood pieces. Maximum temperatures of about 500° C. to about 700° C. typically achieve the desired degree of carbonization without the necessity of reaching extremely high temperatures.

The rate at which the member of cellulose based material is heated can affect the integrity of the member. Conventional wood charcoal, which is formed by carbonization of wood, is broken and cracked due to shrinkage stresses developed from the surface of the wood decomposing faster than the interior. This often results when heating rates are too high for a uniform temperature to be maintained in the decomposing wood. Each type of cellulose-based material used in the present invention (i.e., each species of wood or type of engineered wood or cotton-based product), will require specific heating rates based on the density, permeability, and thickness of the member of cellulose-based material. By "permeability" it is meant the mass transfer of gases through the member of cellulose-based material as the cellulose-based material decomposes to carbon. If permeability is very low, by-product gases build up under pressure causing stress within the member, which may lead to cracking of the member.

Accordingly, during the heating process of the present invention, a sufficiently slow heat-up rate is used to avoid macro-cracking of the member of cellulose-based material and to substantially maintain the member's micro-structure. Heat-up rates of less than about 20° C. per hour between the temperatures of from about 200° C. and about 400° C. have been found to substantially maintain the micro-structure of the member of cellulose-based material.

Where the member is formed from wood, a sufficiently slow heat-up rate between the temperature of about 200° C. to about 400° C. has been found to maintain the cellular structure of the wood used to form the member. This is advantageous because the cellular structure of carbonized wood provides high strength and toughness to the carbonized wood.

Preferably, the heating rate is from about 1° C. to about 10° C. per hour between the temperatures of about 200° C. and about 400° C. More preferably, the heating rate is from about 2° C. to about 5° C. per hour between the temperature of about 200° C. and about 400° C. After a temperature of about 400° C. has been reached, a heating rate of less than about 20° C. per hour is preferred.

The carbonization process of the present invention decomposes a substantial portion of the organic constituents of the cellulose-based material into a carbon residue. Preferably, at least about 95% of the organic constituents of the cellulose-based material comprising a carbon-hydrogen bond (C—H bond) are decomposed to carbon. More preferably, at least 99% of the organic constituents of the cellulose-based material comprising a carbon bond decompose to carbon.

The carbonization process typically results in a substantial weight loss to the member. The weight loss percentage is dependent on the type of cellulose-based material used to form the member. Average weight losses range from about 20% to about 80% based on the weight of the member.

The member may also undergo varying degrees of shrinkage as a result of the carbonization. The amount of shrinkage is dependent on the type of cellulose based material used to form the member. Average amounts of shrinkage range between about 20% and about 45% by volume.

After carbonization is complete, the member is cooled to room temperature (i.e., about 25° C.). Various cooling rates may be used in accordance with the present invention. Preferably, a cooling rate of less than about 100° C. per hour is used to maintain the integrity of the member (i.e., avoid detrimental cracks or voids within the member). Other cooling rates greater than about 100° C. per hour may be utilized as long the integrity of the member is maintained.

The carbonized member so formed has a porous structure. The degree of porosity of the carbonized member is dependent on the type of cellulose-based material used to form the member. Carbonized hardwoods are typically more porous than carbonized softwood, while engineered wood products and cotton-based products have a minimal porosity.

Once cooled to room temperature, the carbonized member, is dimensionally tailored by conventional manufacturing techniques, such as machining, turning, grinding, water jet cutting, and laser cutting. The resultant shape in many cases is the final shape of the ceramic article including final tolerances, such as surface texture requirements.

In accordance with the present invention, carbon of the shaped member is converted to silicon carbide by reacting the carbon with a dry, silica sand. Silica exists in a variety of polymorphic forms including crystalline silica, microcrystalline silica, and non-crystalline silica. Crystalline silica is commercially available as silica sand or quartz sand, while non-crystalline silica is commercially available as silica sol, silica gel, and precipitated silica. The silica sand used in the present invention preferably comprises crystalline silica sand, and more preferably, consists essentially of crystalline silica sand.

The carbon of the member is reacted with silica sand by covering at least a portion of the member with the silica sand and heating the member and the silica sand. The member can be covered with the silica sand by pouring the silica sand over the member so that the silica sand overlays at least a portion of the member, and, preferably, substantially all of the member.

The shaped member and the silica sand can be heated using any heating means, such as a furnace or oven. Preferably, the shaped member and the silica sand are heated in a conventional furnace.

The inert atmosphere in which the carbonized member and silica sand are heated is non-oxidizing. Preferably, the inert atmosphere includes less than about 1% by volume oxidizing gas, and more preferably less than about 1000 ppm oxidizing gas. Examples of non-oxidizing atmospheres are vacuums and atmospheres, which consist essentially of inert gases and/or noble gases. An atmosphere that consists essentially of nitrogen gas is a preferred non-oxidizing atmosphere.

The shaped member and the silica sand can also be heated at subatmospheric, atmospheric, or superatmospheric pressures. Preferably, the shaped member and silica sand are heated at essentially atmospheric pressure for convenience.

The temperature to which the shaped member and silica are heated in the inert atmosphere is that temperature sufficient to cause the silica sand to melt. At this temperature, the melted silica reacts with carbon to form silicon carbide. The reaction scheme for this process is as follows:

$$SiO_2 + 3C \rightarrow SiC + 2CO$$

or $$2SiO_2 + 3C \rightarrow SiC + SiO + 2CO$$
$$SiO + 2C \rightarrow SiC + 2CO$$

Preferably, the temperature at which the shaped member and silica are heated is at least about 1000° C., and more preferably at least about 2000° C.

The melted silica is absorbed through the pores of the shaped member so that substantially all of the melted silica reacts with carbon of the member. Preferably, the amount of silica sand provided is that amount effective to convert all of the carbon of the member to silicon carbide (i.e., a stoichiometric amount of silica to carbon). More preferably, the amount of silica provided is in excess of the amount effective to convert all of the carbon to silicon carbide. By providing an excess of silica, the voids within the member are filled so that the member has a smooth surface free of pores. This amount of excess silica sand provided is dependent upon the porosity and amount of voids within the carbonized member.

After the carbon of the member is reacted with the silica to form silicon carbide, the member is cooled to room temperature (i.e., about 25° C.). The member can be cooled by removing the member from the conventional heating apparatus and placing it in an atmosphere, which is at room temperature.

The cooled ceramic article so formed has a silicon carbide matrix structure with channels of silicon dioxide that extend through the matrix. The dimensions of the ceramic article are essentially the same as the dimensions of the shaped member. Moreover, the surface texture of the ceramic article is essentially the same as or smoother than the surface texture of the shaped member. Thus, no additional machining of the ceramic article is required to shape the ceramic article and only a polishing operation may be required before the ceramic article is used.

The ceramic article has a Mohs hardness of at least about 8 and is resistant to decomposition at temperatures up to about 1000° C. The strength of the ceramic article is dependent on the cellulose-based material used to form the ceramic article. Natural woods typically produce a stronger ceramic article than engineered woods and cotton-based products. Natural wood products include a matrix (i.e., three dimensional structure) of cross-linked cellulose fibers, which in turn forms a matrix of cross-linked carbon fibers upon carbonization of the natural wood. These carbon fibers when ceramitized to silicon carbide form a matrix of cross-linked silicon carbide fibers, which provide strength to the ceramic article. In contrast, engineered woods and cotton-based products do not include a matrix of cross-linked cellulose fibers but instead include planar layers of cross-linked cellulose fibers. These layers of cellulose fibers typically do not provide as much strength to a ceramic article formed from the engineered woods and the cotton-based products as a ceramic article formed from a wood.

Optionally, the ceramic article can be hot isostatic pressed after cooling the ceramic article but before polishing the ceramic article. Hot isostatic pressing consolidates the ceramic article by reducing any interstitial voids in the ceramic article and increasing the density of the ceramic article. Consolidation of the ceramic article increases the strength and hardness of the ceramic article. Preferably, ceramic articles formed using engineered woods and cotton-based products are hot isostatic pressed after cooling the ceramic article but before polishing the ceramic article in order to increase the strength and hardness of these ceramic articles.

The method of the present invention can be used to make various ceramic articles. In accordance with one embodiment of the present invention the ceramic article can be a ceramic engine component. One example of a ceramic engine component that can be made using the method of the present invention is a valve shim for a valve mechanism of an internal combustion engine.

Figure 2:
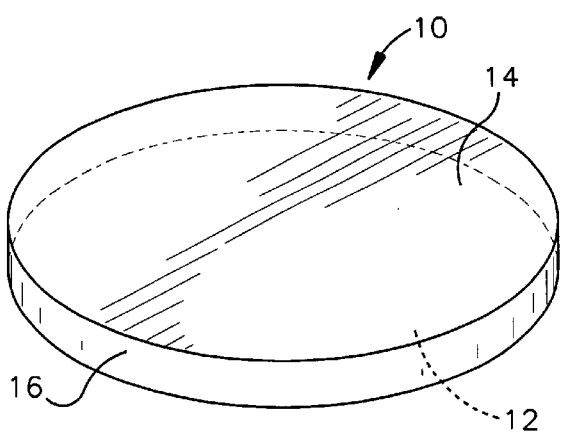
FIG. 2 is a schematic illustration of a ceramic valve shim in accordance with the present invention.

FIG. 2 is a schematic illustration of a ceramic valve shim 10 in accordance with the present invention. The ceramic valve shim 10 has a disk shape with a first circular surface 12, a second circular surface 14 axially aligned over the first surface 12, and a annular surface 16, which interconnects and is perpendicular to the first surface 12 and the second surface 16. The ceramic valve shim 10 preferably has a diameter of about 30 mm±0.1 mm and a thickness of about 2.5 mm±0.1 mm.

Figure 3:
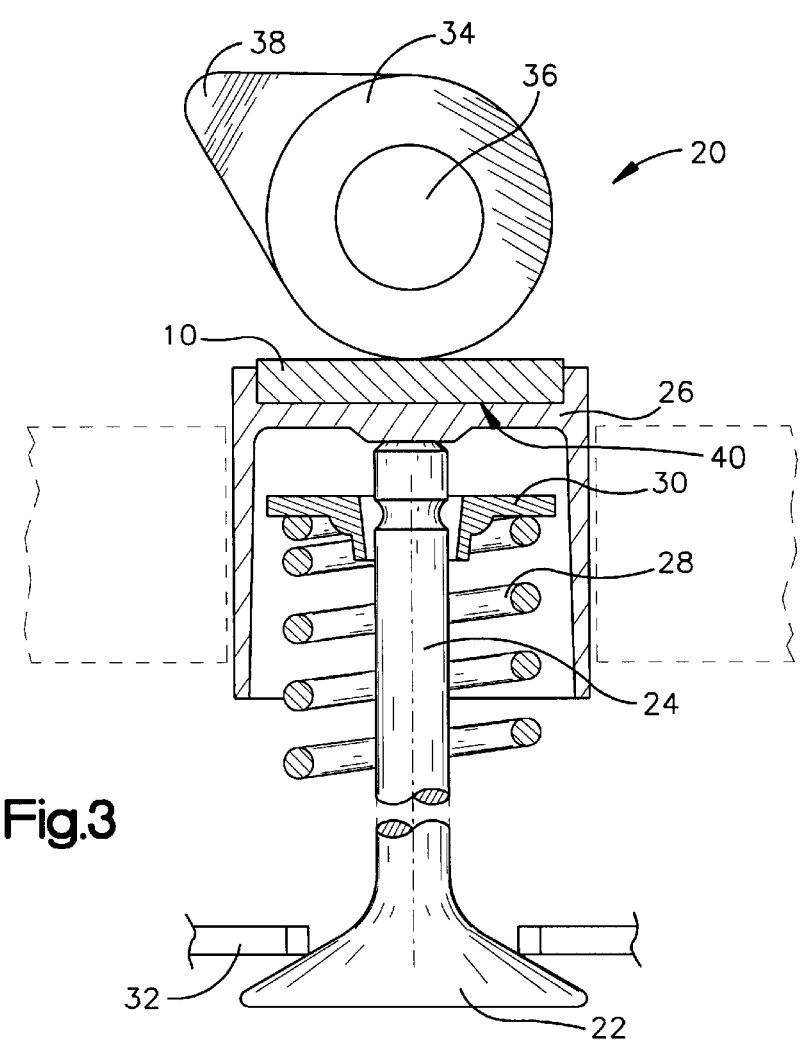
FIG. 3 is a cross-sectional view of a valve mechanism in which the ceramic valve shim of FIG. 2 is used.

FIG. 3 is a cross-sectional view of a valve mechanism 20 for an internal combustion engine in which the valve shim 10 is used. The valve mechanism 20 includes a valve head 22, a valve stem 24, and a valve tappet 26. The valve stem 24 is formed in one-piece with the valve head 22 and engages the valve tappet 26. A valve spring 28 extends about the valve stem 24. The valve spring 28 engages a spring retainer 30 that is connected to the valve stem 24. The spring retainer transmits pressure from the spring 28 to the valve head 22 to press the valve head 22 to a closed position against a valve seat 32.

The valve tappet 26 reciprocates to move the valve head 22 away from the valve seat 32 to an open position due to rotation of a cam 34 on a camshaft 36. FIG. 3 shows that the cam 34 is provided overhead of the engine cylinder (not shown) and that the cam 34 is simply a collar with a raised section 38 or lobe that is provided on the camshaft 36. When the camshaft 36 rotates the lobe 38 rotates.

The valve tappet 26 rides against the cam 34. As the lobe 38 moves against the valve tappet 26, the valve tappet 26 is displaced. Displacement of the valve tappet 26 causes the valve head 22 to be displaced from the valve seat 32 within the engine cylinder to an open position. When the lobe 38 on the cam 34 moves away from the valve tappet 26, pressure from the spring 28 forces the valve head 22 to reseat. At the same time, the valve tappet 26 is also forced by the spring 28 so that it remains in contact with the cam 34.

The valve tappet 26 includes a recess 40 in which the valve shim 10 is positioned. The cam 34 mounted on the camshaft 36 is rotated at a very high rate, and pushes the shim 10, so as to effect periodic opening and closing of the valve head 22. Therefore, much shock and concentrated force must be loaded periodically and repeatedly on the surface of the valve shim 10 with which the cam 34 is in contact.

In accordance with the present invention, the valve shim 10 is formed by first providing a member of cellulose based material. The cellulose based material is preferably a kiln dried soft wood such as a pine (e.g., *Pinus strobus*) or balsa (e.g., *Ochroma pyramidale*). Softwoods are preferred as these woods upon carbonization produce a micro-porous structure of interconnected cells. Moreover, these softwoods are relatively inexpensive compared to other natural woods.

The dimensions of the member, including thickness, length, and width, are each preferably twice as large as the dimension the final shape of the valve shim. This allows for shrinkage that occurs when the wood is carbonized.

The member of wood is placed in a conventional furnace and heated to a temperature effective to carbonize the cellulose in the wood to carbon. The member of wood is preferably heated within the furnace from room temperature (i.e., 25° C.) at a rate of about 15° C. per hour to a temperature of about 900° C. Once at about 900° C., the temperature of member within the furnace is held at about 900° C. for about 0.5 hours, and then cooled at a rate of about 50° C. per hour to room temperature. During heating of the member within the furnace, nitrogen is flowed through the furnace at rate of about 0.5 L per minute to maintain an essentially nitrogen atmosphere within the furnace. The pressure within the furnace is slightly above atmospheric.

The carbonized wood member has a volume of about 20% to about 50% less than the volume of the wood member prior to carbonization. No visible cracks were observed in the carbonized member of wood.

The carbonized member of wood is then machined using a milling machine with a ceramic abrasive wheel to the shape of the valve shim. The machined carbonized member had a disk shape with a first circular surface, a second circular surface axially aligned over the first surface, and an annular surface, which interconnects and is perpendicular to the first surface and the second surface. The machined carbonized member had a diameter of about 30 mm±0.1 mm and a thickness of about 2.5 mm±0.1 mm. Surprisingly, it was found that the first surface and the second surface of the carbonized member could be sanded so that first surface and the second surface have a surface texture with a maximum $R_a$ (i.e., Rough average) of about 1.0 $\mu$m as determined by the test method ISO R468. It is believed the micro-porous cell structure of the carbonized member allows for this fine surface texture to be produced.

The machined carbonized member is then placed on a metal tray. A quantity of commercially available silica sand is poured over the machined carbonized member so that the machined carbonized member is substantially covered by the sand. The amount of silica sand used is slightly in excess of that amount effective to convert all of the carbon of the carbonized member to silicon carbide.

The metal tray with the machined carbonized member covered with the silica sand is placed in a conventional furnace. The furnace is maintained at a temperature of about 2000° C. while nitrogen is flowed through the furnace at rate of 0.5 L per minute to maintain an essentially nitrogen atmosphere within the furnace. The pressure within the furnace is slightly above atmospheric.

The machined carbonized member and silica are heated in the furnace for about ten minutes. During heating of the carbonized member within the furnace, the carbon within the carbonized member is converted to silicon carbide. It is believed the silica upon being heated initially melts and that the melted silica is absorbed into the micro-pores of the machined carbonized member by capillary attraction. The melted silica then reacts with carbon of the carbonized member to form silicon carbide. The excess silica fills the micro-pores of the member.

After ten minutes within the oven, the member is removed and allowed to cool to room temperature (i.e., about 25° C.). The valve shim so formed has the exact dimensions of the machined carbonized member. The surface texture of the valve shim is the same as or smoother than the surface texture of the machined carbonized member.

The valve shim comprises a silicon carbide matrix with channels of silicon dioxide extending through the matrix. The valve shim has a high a hardness and is resistant to temperatures up to about 1000° C.

The valve shim produced in accordance with the present invention was placed in wear testing mechanism that simulates the friction and wear that the valve shim would encounter in a Ford DEW Motor during the lifetime of the valve shim. The valve shim demonstrated superior wear resistance outlasting by five times, as determined by length of time, a conventional valve shim, which is manufactured from steel. Moreover, the cost of production of a ceramic valve shim formed by the method of the present invention is at least half the cost of a conventional valve shim made of steel, and one tenth the cost of a valve shim made of ceramic by traditional ceramic forming processes.

It should be understood that the method of the present invention can be used to form other engine components such as valve seat inserts, valve piston pins, fuel nozzles, valve heads, valve rotators, valve lifters, camshaft lobes, push rods, valve guides, cylinder heads, pistons, liners, bearings, and sound insulation.

Moreover, it should be understood that the method of the present invention can be used to produce other ceramic articles, which are not engine components. Examples of other ceramic articles are automobile trim, including interior and exterior automobile styling components, brake materials, such as brake pads and brake pistons, sound damping materials, vibration damping materials, pipes for high temperature mediums, non-automotive valve parts, such as valve seals and pistons, radiation containment materials, fuel cells, and catalytic substrates.

From the above description of the present invention, those skilled in the art will perceive improvements, changes, and modifications in the invention. Such improvements changes, and modifications within the skill of the art are intended to be covered by the appended claims.

Having described the invention, the following is claimed:

1. A method of making a ceramic article, said method comprising the steps of:
   providing a member, said member including a cellulose-based material;
   carbonizing said cellulose-based material to carbon;
   covering at least a portion of said member with silica sand after carbonizing; and
   converting at least a portion of said carbon of said member, which has been carbonized, to silicon carbide.

2. The method of claim 1 wherein the member comprises a cellulose-based material selected from the group consisting of a wood, an engineered wood product, a cotton-based product, and a combination thereof.

3. The method of claim 1 wherein at least a portion of said carbon of said member is converted to silicon carbide by heating said member and said silica sand in the presence of an inert atmosphere to a temperature sufficient to cause said silica sand to melt.

4. The method of claim 3 wherein the silica sand consists essentially of a crystalline silica sand.

5. The method of claim 3 wherein the amount of silica sand used to cover said member is that amount effective to convert all of the carbon of said member to silicon carbide.

6. The method of claim 3 wherein the amount of silica sand used to cover said member is an amount in excess of that amount effective to convert all of the carbon of said member to silicon carbide.

7. The method of claim 3 further comprising the step of hot isostatic pressing said member after converting the carbon of said member to silicon carbide.

8. The method of claim 7 wherein the cellulose based material is selected from the group consisting of an engineered wood product and a cotton-based product.

9. A method of making a ceramic engine component, said method comprising the steps of:
   providing a cellulose based member;
   heating said member in a substantially non-oxidizing atmosphere to carbonize said cellulose based member to substantially carbon;
   machining said member after carbonization to provide at least one surface of said member with a $R_a$ surface texture with a maximum of about 1.0 μm;
   covering said machined member with silica sand, said amount of sand upon reaction with said carbon in said member being effective to convert substantially all of said carbon to silicon carbide; and
   heating said machined member covered with said silica sand in a substantially non-oxidizing atmosphere until essentially all of said carbon in said member reacts with said silica sand to form silicon carbide.

10. The method of claim 9 wherein said engine component is a valve shim.

11. The method of claim 9 wherein said cellulose-based member comprises a natural wood.

12. The method of claim 9 wherein said cellulose-based member is selected from the group consisting of an engineered wood product and a cotton-based product.

13. The method of claim 12 further comprising the step of hot isostatic pressing said member after converting the carbon of said member to silicon carbide.

14. The method of claim 9 wherein the silica sand consists essentially of a crystalline silica sand.

15. The method of claim 9 wherein the amount of silica sand used to cover said member is an amount in excess of that amount effective to convert all of the carbon of said member to silicon carbide.

16. A method of making a ceramic article, said method comprising the steps of:
   providing a member comprising a carbonized cellulose-based material, said cellulose based material being selected from the group consisting of a wood, an engineered wood product, a cotton-based product, and a combination thereof;
   covering at least a portion of said carbonized material of said member with silica sand;
   heating said member and said silica sand in the presence of an inert atmosphere to a temperature effective to convert carbon in said carbonized material to silicon carbide.

17. The method of claim 16 wherein the amount of silica sand used to cover said member is an amount effective to convert substantially all of said carbon of said member to silicon carbide.

18. The method of claim 16 wherein the amount of silica sand used to cover said member is an amount in excess of that amount effective to convert substantially all of said carbon of said member to silicon carbide.

* * * * *